United States Patent
Heilman et al.

[11] Patent Number: 6,044,903
[45] Date of Patent: Apr. 4, 2000

[54] WATER CONDITIONING ASSEMBLY

[75] Inventors: Dawn M. Heilman; Mark S. Heilman, both of Temperance, Mich.

[73] Assignee: Frigid Units, Inc., Toledo, Ohio

[21] Appl. No.: 09/026,972

[22] Filed: Feb. 20, 1998

[51] Int. Cl.[7] .................................................. F25B 29/00
[52] U.S. Cl. ..................... 165/263; 165/299; 165/300; 62/434
[58] Field of Search .................................. 165/108, 263, 165/299, 300; 119/262, 229; 62/434, 435

[56] References Cited

U.S. PATENT DOCUMENTS

| | | | |
|---|---|---|---|
| 1,432,281 | 10/1922 | Ehrhart | 165/300 |
| 1,841,068 | 1/1932 | Starling | 62/434 |
| 2,232,998 | 2/1941 | Cernohouz et al. . | |
| 2,430,837 | 11/1947 | Tutein | 165/263 |
| 2,703,966 | 3/1955 | Snelson | 62/434 |
| 3,195,620 | 7/1965 | Steinhardt, Jr. | 165/263 |
| 3,323,578 | 6/1967 | Hermann | 165/263 |
| 3,370,454 | 2/1968 | Flores | 165/299 |
| 3,468,288 | 9/1969 | Cassil . | |
| 3,480,076 | 11/1969 | Tomita | 165/254 |
| 3,493,037 | 2/1970 | Haake | 165/263 |
| 3,680,630 | 8/1972 | Watts . | |
| 3,716,025 | 2/1973 | Lawson | 119/5 |
| 3,730,260 | 5/1973 | Raymond . | |
| 3,777,802 | 12/1973 | Young | 165/299 |
| 4,151,810 | 5/1979 | Wiggins | 119/5 |
| 4,182,267 | 1/1980 | Kominami et al. . | |
| 4,712,607 | 12/1987 | Lindemans et al. | 165/263 |
| 4,867,102 | 9/1989 | Turano . | |
| 4,984,628 | 1/1991 | Uchida et al. . | |
| 5,299,424 | 4/1994 | Woodson et al. . | |

FOREIGN PATENT DOCUMENTS 10-141831  5/1998  Japan ..................... 165/263

Primary Examiner—Ira S. Lazarus
Assistant Examiner—Terrell McKinnon
Attorney, Agent, or Firm—Emch, Schaffer, Schaub & Porcello, Co., L.P.A.

[57] ABSTRACT

A drop-in, portable, water conditioning assembly for use in a tank containing water is disclosed. The water conditioning assembly includes a refrigeration unit having a compressor assembly, a condenser and at least one depending evaporator coil for insertion into the tank water. A heating element also ends downwardly from a base and a temperature controller is operatively connected to both the refrigeration unit and the heating element for controlling both the heating and cooling of the water. A motor drives a depending shaft which mounts a blade. The blade both aerates and circulates water within the tank.

9 Claims, 3 Drawing Sheets

WATER CONDITIONING ASSEMBLY

BACKGROUND OF THE INVENTION

The present invention relates to a water conditioning assembly for use in a tank containing water. Many research and commercial facilities including university laboratories and state laboratories use tanks to conduct research. The tanks may be similar to that shown in U.S. Pat. No. 4,457,441, owned by the present assignee. The tanks hold many types of living species including fish and plants. In addition commercial facility tanks are often used to raise, for example fish, until they reach a size where they are either placed in other tanks or introduced into a stream.

While the prior art shows aquarium type units having cooling and heating, the present unit is of a larger apparatus including heating, cooling, aerating and circulation in a unitary drop-in structure.

It has been found that by closely controlling water temperatures, by both heating and cooling, better results are achieved.

In addition, in a commercial trout fishery, if it is possible to heat and cool the water temperature to a predetermined desired temperature, the growth of the trout can be greatly advanced over trout that is raised in ambient temperature water.

SUMMARY OF THE INVENTION

An object of the present invention is to provide a portable water conditioning assembly which provides heating, cooling and aeration of water within a tank, all with a single unit.

The water conditioning assembly includes a refrigeration unit having at least one evaporator coil extending downwardly for insertion into the water of the tank for cooling the water to a first predetermined temperature. A heating element also extends downwardly into the tank for heating the water to a second predetermined temperature. The water conditioning assembly includes a motor which is mounted on the unit base and has a motor driven shaft extending downwardly mounting a blade adjacent its lower end. The blade not only aerates the water in the tank but also circulates water throughout the tank.

In a preferred embodiment, a filter unit is positioned below the circulating and aerating blade whereby water from the tank is circulated through the filtering unit.

The primary object of the present invention is to provide in a single unitary water conditioning assembly the ability to closely control the heating or cooling of tank water and at the same time aerate and circulate the water within the tank.

DETAILED DESCRIPTION OF THE PREFERRED EMBODIMENTS

Figure 1:
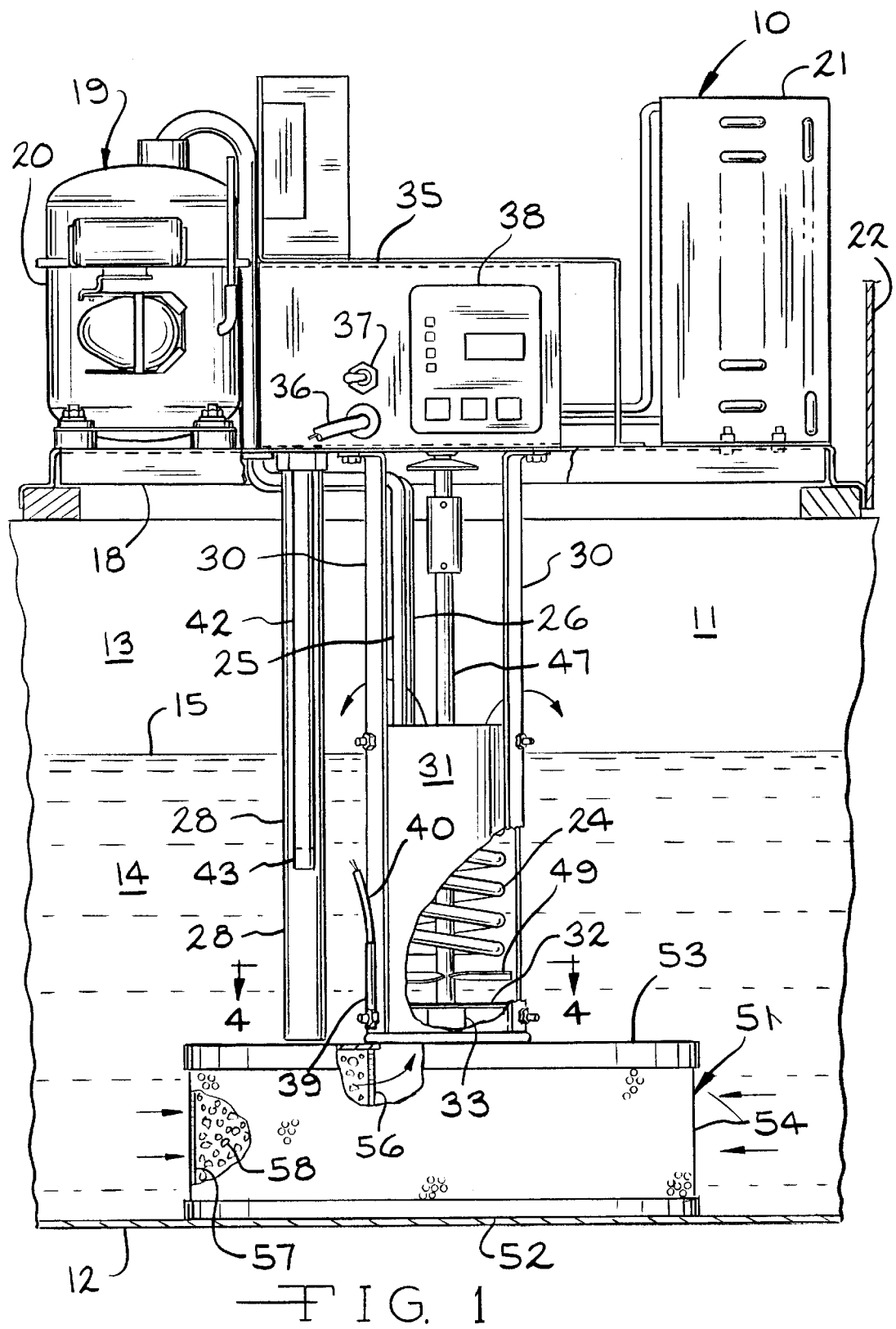
FIG. 1 is a front elevational view, partially in cross-section, showing a water conditioning assembly, according to the present invention.
Figure 2:
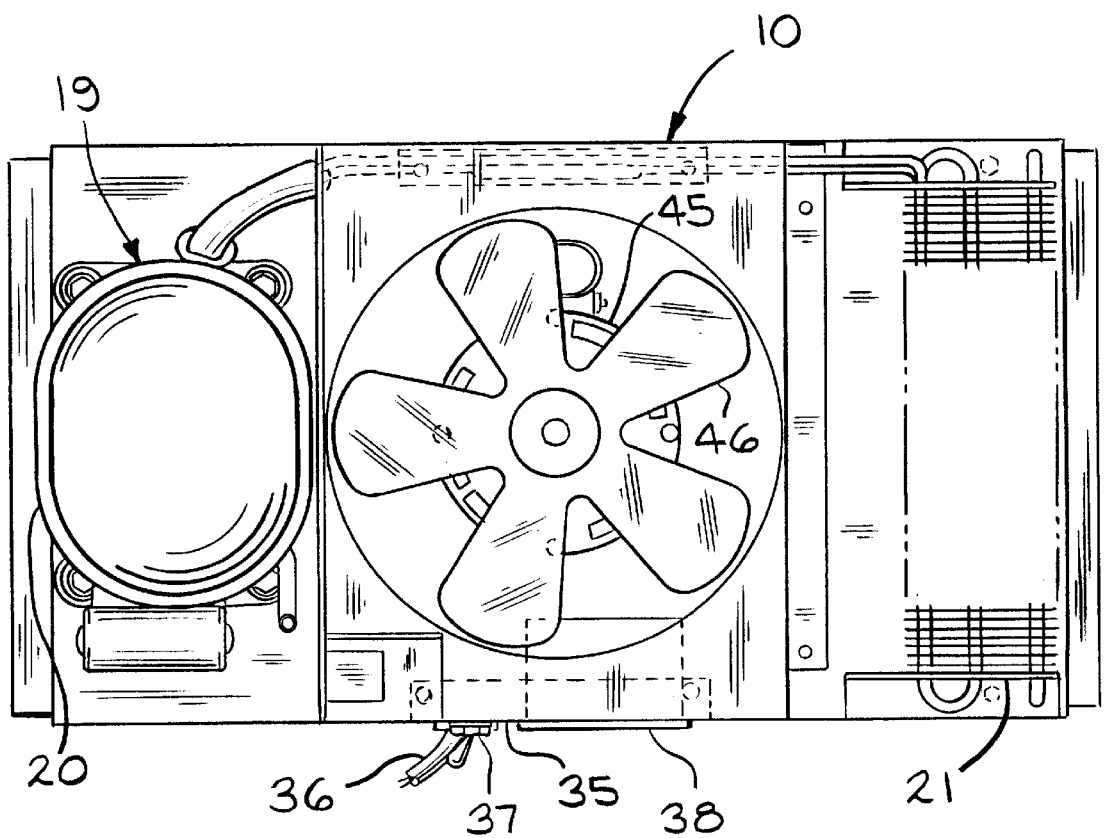
FIG. 2 is a top plan view of the water conditioning assembly of FIG. 1.
Figure 3:
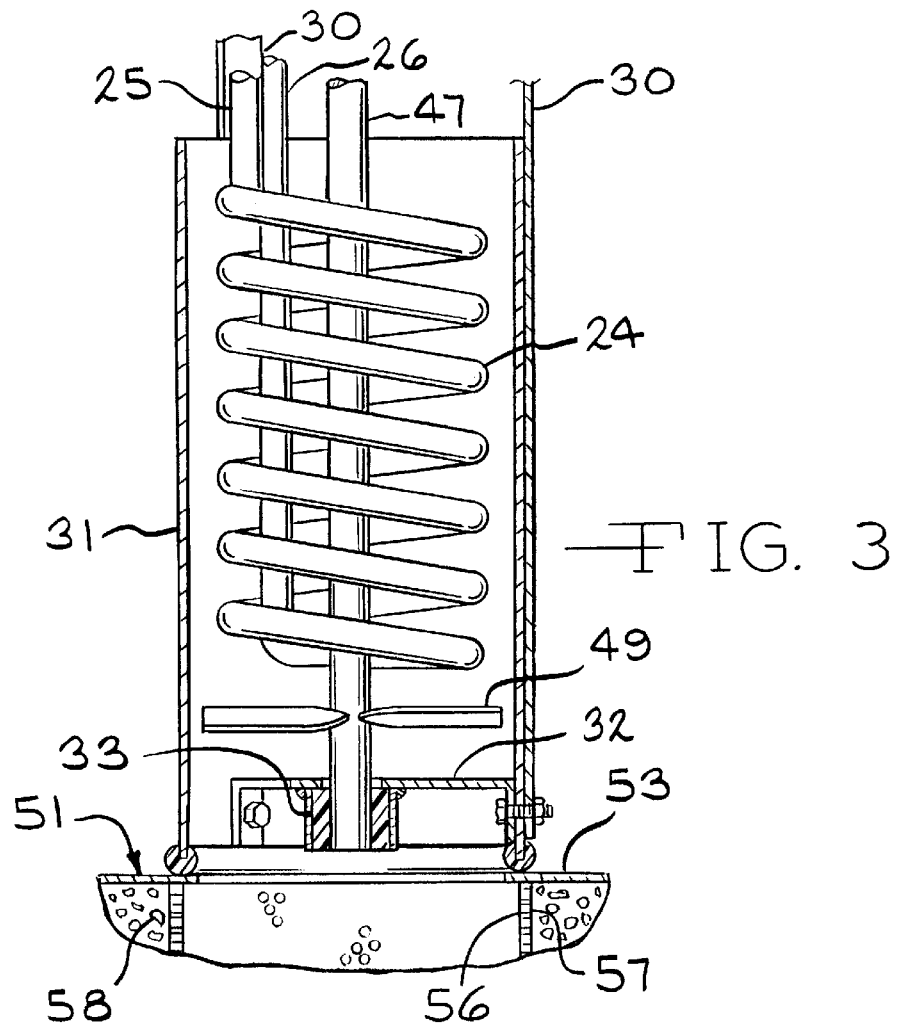
FIG. 3 is an enlarged cross-sectional view of a portion of the water conditioning assembly, according to the present invention.

Referring to FIGS. 1 and 2, a water conditioning assembly, according to the present invention, is generally indicated by the reference number 10. The water conditioning assembly 10 is preferably a portable assembly which one can "drop-in" a tank without additional plumbing. In FIGS. 1 and 2, the water conditioning assembly 10 is positioned in a tank 11. The tank is similar to the tank shown in U.S. Pat. No. 4,457,441. The tank 11 includes a bottom 12 and sidewalls 13. Water 14, having an upper surface 15 is held within the tank 11.

The water conditioning assembly 10 includes a base 18 which is mounted on the tank 11. A refrigeration unit 19 has a compressor assembly 20 and a condenser or heat exchanger 21 both mounted on the base 18. A housing 22, which is partially shown in FIG. 1 preferably encloses the compressor assembly 20 and condenser 21. The refrigeration unit 19 includes at least one evaporator coil 24 which extends downwardly from the base 18 for insertion into the water 14. The evaporator coil 24 is operatively connected by conduits 25 and 26 to the compressor assembly 20 and the condenser 21. The refrigeration unit 19, including the evaporator coil 24 extending into the water 14, cools the water 14 to a first predetermined temperature.

A heating element 28 extends downwardly from the base 18 for insertion into the water 14 of the tank 11. In the present embodiment, the heating element 28 is a prior art tube type electrical resistance heater. The heating element 28 heats the water to a second predetermined temperature.

Referring to FIG. 1, supports 30 extend downwardly from the base 18 and mount a cylindrical housing 31 at their lower end. The housing 31 surrounds the evaporator coil 24. A horizontal support plate 32 is attached to the lower end of the cylindrical housing 31 and mounts a bearing 33.

A control unit 35 is mounted on the base 18 and includes an electrical power supply 36 and a main power switch 37. The control unit 35 includes a temperature controller 38 mounted adjacent the base 18. In the present embodiment, the temperature controller 38 is a prior art DM15D microprocessor based temperature controller manufactured by Process Technology of Mentor, Ohio.

A temperature sensor 39 is mounted adjacent the bottom of the cylindrical housing 31. The temperature sensor 39 is operatively connected to the temperature controller 38 by an electrical conduit 40. In a normal operation, the temperature controller 38 is set at both a first predetermined temperature for cooling and a second predetermined temperature for heating. While the first and second predetermined temperatures can be set to the same temperature, normally if a Fahrenheit scale is used, they are set one degree Fahrenheit apart from one another. After the first and second predetermined temperatures have been set at the temperature controller 38, the temperature sensor 39 relays the actual temperature of the water 14 to the temperature controller 38. The microprocessor then activates either the refrigeration unit 19 or the heating element 28 based upon the sensed need to adjust the temperature of the water 14.

In other embodiments, the temperature controller 38 is not mounted adjacent the base 18 but is, for example, positioned in a remote panel where several tanks and several water conditioning assemblies 10 are operated by a single computer-temperature controller apparatus.

Referring to FIG. 1, a tube 42 extends downwardly from the base 18 along the heating element 28. The tube 42 is a water level sensor having a temperature activated fuse 43 at its lower end. The fuse 43 is in electrical communication with the power supply 36. If the upper surface of the water 15 reaches a level which is below the water level sensor tube 42, the fuse 43 is activated and the circuit opened to the electrical power supply 36.

Figure 4:
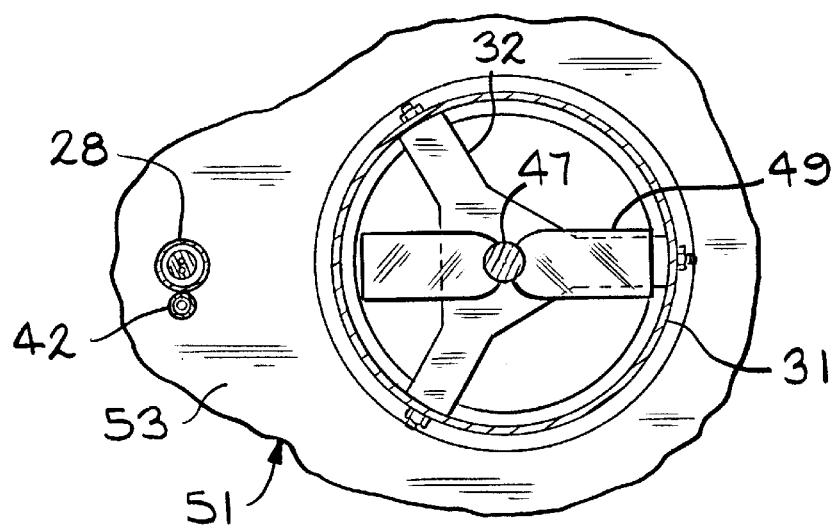
FIG. 4 is a cross-section view taken along the line 4—4 of FIG. 1.

Referring to FIG. 2, an electric motor 45 is mounted on the base 18 and drives an upper cooling and circulating fan 46, located adjacent the refrigeration unit 19. The circulating fan 46 delivers cooling air to the compressor assembly 20, the motor 45 and the condenser 21. A motor shaft 47 is driven by the motor 45 and extends downwardly below the base 18 for insertion in the water 14. The shaft 47 is concentrically located within the evaporator coil 34 and the cylindrical housing 31. The lower end of the shaft 47 is journaled by the bearing 33. A blade 49, indicated in FIGS. 1 and 4, is mounted adjacent the lower end of the shaft 47. Rotation of the shaft 47 and the blade 49 both aerates and circulates the water 14 within the tank 11.

In one embodiment of a water conditioning assembly, according to the present invention, a filtering unit 51 is mounted below the cylindrical housing 31. In this embodiment, as shown in FIG. 1, the filtering unit 51 is cylindrical and includes a circular bottom 52, a circular cover 53 having a center opening aligned with the shaft 47 and a cylindrical screen 54 positioned between the bottom 52 and the top 53. An inner circular screen wall 56 is concentric with and has a lessor diameter than the circular outer screen 54. The circular screen 54 and the inner circular screen wall 56 define a chamber 57 between the bottom 52 and top 53. The chamber 57 receives one of a variety of filtering media, such as activated charcoal 58.

When the motor 45 is energized and the shaft 47 and blade 49 rotate, the blade 49 in addition to aerating the water 14 also circulates the water 14 through the filter unit 51, as indicated by the arrows in FIG. 1.

In other embodiments, the filtering unit 51 is not included as a component of the entire drop-in water conditioning assembly 10.

The water conditioning assembly 10 provides a unitary drop-in unit for any tank without additional plumbing. The water conditioning assembly 10 cools or heats on demand and only requires the one electrical power input or supply 36. The water conditioning assembly 10 both circulates and aerates the water in one operation. If desired, filtering is also included. While a single evaporator coil 24 is indicated in FIG. 1, it is understood that multiple coils are utilized in larger capacity units.

Depending on the capacity of the water conditioning assembly 10, the size of the motor 45 may vary between one-sixth horse-power and two horse-power, with preferred sizes in the one-third horse-power to one horse-power range. As a way of example, a one horse-power motor is normally used for three hundred to five hundred gallon tanks where the temperature, range is between 35–70° F.

In smaller tanks of between one hundred and two hundred gallons operating in the same temperature range, a one-third horse-power motor is normally sufficient.

The temperature controller 38 can be programmed to operate in either degrees Fahrenheit or degrees Celsius.

Many revisions may be made to the above described water conditioning assembly 10 without departing from the scope of the above described invention or from the following claims.

What is claimed is:

1. A self-contained water conditioning assembly for use in a tank containing water, such tank having a bottom and upstanding sidewalls, said water conditioning assembly including a base for mounting on said tank, a refrigeration unit including a compressor assembly and a condenser mounted on said base, at least one evaporator coil operatively connected to said compressor assembly and said condenser, said evaporator coil extending downwardly below said base for insertion into the water in said tank for directly cooling said water within said tank to a first predetermined temperature, a heating element extending downwardly from said base for insertion into the water in said tank for directly heating said water within said tank to a second predetermined temperature, a motor mounted on said base, a shaft driven by said motor extending downwardly below said base for insertion in said water, said shaft having a lower end, a blade mounted adjacent said lower end of said shaft for both aerating and circulating the water in said tank, a temperature controller mounted adjacent said base and operatively connected to said refrigeration unit and said heating element, whereby said temperature controller is set at said first and second predetermined temperatures for activating said refrigeration unit and said heating element when the water temperature in said tank varies from said first and second predetermined temperatures and a filter unit mounted below said lower end of said shaft for filtering water circulated by said blade.

2. A water conditioning assembly according to claim 1, wherein said filter unit defines a chamber and activated charcoal filtering medium is positioned within said chamber.

3. A self-contained water conditioning assembly for use in a tank containing water, said tank having a bottom and upstanding sidewalls, said water conditioning assembly including a base for mounting on said tank, a refrigeration unit including a compressor assembly and a condenser mounted on said base, said refrigeration unit including at least one evaporator unit operatively connected to said compressor and said condenser for insertion into said tank for directly cooling said water within said tank to a first predetermined temperature, a heating element extending downwardly from said base for insertion into said tank for directly heating the water within said tank to a second predetermined temperature, a temperature controller mounted adjacent said base and operatively connected to said refrigeration unit and said heating element, wherein said temperature controller is set to said first and second predetermined temperatures for activating said refrigeration unit and said heating element when the water temperature in said tank varies from said first and second predetermined temperatures, a motor mounted on said base, a shaft driven by said motor and extending downwardly below said base, said shaft having a lower end, a blade mounted adjacent said lower end of said shaft for aerating and circulating the water in said tank at least one support extending downwardly from said base below said lower end of said shaft, a cylindrical filter unit operatively connected to said at least one support, said filter unit defining a chamber for receiving a filtering media.

4. A water conditioning unit according to claim 3 including a plurality of supports extending downwardly from said base, a support plate mounted by said plurality of supports and a bearing mounted by said support plate, said support plate journaling said lower end of said shaft.

5. A water conditioning unit, according to claim 4, including a cylindrical housing surrounding said shaft adjacent its lower end, and a temperature sensor mounted adjacent said cylindrical housing and operatively connected to said temperature controller, whereby said temperature sensor senses the temperature of the water in the tank.

6. A water conditioning unit, according to claim 5, including a cooling fan driven by said motor.

7. A water conditioning assembly, according to claim 3, including a low water level sensor mounted adjacent said base for extending downwardly into said tank, said water level sensor being operatively connected to said heating element, whereby electrical power to said heating element is terminated when the water level in said tank reaches a low level.

8. A self-contained water conditioning assembly for use in a tank containing water, such tank having a bottom and upstanding sidewalls, said water conditioning assembly including a base for mounting on said tank, a refrigeration unit including a compressor assembly and a condenser mounted on said base, at least one evaporator coil operatively connected to said compressor assembly and said condenser, said evaporator coil extending downwardly below said base for insertion into the water in said tank for directly cooling said water within said tank to a first predetermined temperature, a heating element extending downwardly from said base for insertion into the water in said tank for directly heating said water within said tank to a second predetermined temperature, a motor mounted on said base, a shaft driven by said motor extending downwardly below said base for insertion in said water, said shaft having a lower end, a blade mounted adjacent said lower end of said shaft for both aerating and circulating the water in said tank, a temperature controller mounted adjacent said base and operatively connected to said refrigeration unit and said heating element, whereby said temperature controller is set at said first and second predetermined temperatures for activating said refrigeration unit and said heating element when the water temperature in said tank varies from said first and second predetermined temperatures, a cylindrical housing surrounding said shaft adjacent its lower end and a temperature sensor mounted adjacent said housing and operatively connected to said temperature controller, whereby the temperature sensor senses the temperature of the water in said tank.

9. A water conditioning assembly, according to claim 4 including a low water level sensor mounted below said base and extending downwardly into said tank, said water level sensor operatively connected to said heating element whereby electrical power to said heating element is terminated when the water level in said tank reaches a low level.

* * * * *

UNITED STATES PATENT AND TRADEMARK OFFICE
CERTIFICATE OF CORRECTION

PATENT NO. : 6,044,903

DATED : April 4, 2000

INVENTOR(S) :
Dawn M. Heilman and Mark S. Heilman

It is certified that error appears in the above-identified patent and that said Letters Patent is hereby corrected as shown below:

In column 6, line 14, delete "4" and insert --8--.
In column 6, line 16, between the words "said" and "water", insert --low--.

Signed and Sealed this

Twenty-ninth Day of May, 2001

Attest:

NICHOLAS P. GODICI

*Attesting Officer*    *Acting Director of the United States Patent and Trademark Office*